United States Patent
Jin

(10) Patent No.: US 9,579,747 B2
(45) Date of Patent: Feb. 28, 2017

(54) SHEAR BONDING DEVICE AND SHEAR BONDING METHOD OF METAL PLATES

(71) Applicants: SUNGWOO HITECH CO., LTD., Busan (KR); PUKYONG NATIONAL UNIVERSITY BUSINESS INCUBATOR CENTER, Busan (KR)

(72) Inventor: In Tai Jin, Busan (KR)

(73) Assignees: SUNGWOO HITECH CO., LTD., Busan (KR); PUKYONG NATIONAL UNIVERSITY BUSINESS INCUBATOR CENTER, Busan (KR)

( * ) Notice: Subject to any disclaimer, the term of this patent is extended or adjusted under 35 U.S.C. 154(b) by 58 days.

(21) Appl. No.: 14/475,323

(22) Filed: Sep. 2, 2014

(65) Prior Publication Data
US 2015/0060530 A1  Mar. 5, 2015

(30) Foreign Application Priority Data

Sep. 3, 2013  (KR) .......................... 10-2013-0105737

(51) Int. Cl.
*B23K 37/00* (2006.01)
*B23K 37/02* (2006.01)
(Continued)

(52) U.S. Cl.
CPC ............ *B23K 20/028* (2013.01); *B23D 31/00* (2013.01); *B23K 2201/185* (2013.01)

(58) Field of Classification Search
CPC  B23K 20/028; B23K 20/023; B23K 2201/16; B23K 2201/18; B23K 11/087;
(Continued)

(56) References Cited

U.S. PATENT DOCUMENTS 3,081,673 A * 3/1963 Ansel ................... B23D 79/026
219/101
6,213,381 B1 * 4/2001 Funamoto ........... B21B 15/0085
228/141.1
(Continued)

FOREIGN PATENT DOCUMENTS

KR  10-0622524  9/2006
KR  10-0622535  9/2006
(Continued)

*Primary Examiner* — Erin Saad
(74) *Attorney, Agent, or Firm* — LEX IP MEISTER, PLLC

(57) ABSTRACT

A shear bonding device and a shear bonding method of metal plates are disclosed. The shear bonding device may include: an upper shear bonding mold having more than one upper perpendicular tooth and more than one upper slanted tooth formed alternately on a front end surface thereof; a lower shear bonding mold overlapped with the upper shear bonding mold in a vertical direction by a predetermined width below the upper shear bonding mold, and having more than one lower perpendicular tooth corresponding to the more than one upper slanted tooth and the more than one upper perpendicular tooth corresponding to the more than one lower slanted tooth formed alternately on a front end surface confronting the upper shear bonding mold; an upper heating clamper including a front end surface contacting with the upper perpendicular tooth of the upper shear bonding mold and adapted to generate heat by receiving power from a power supply; a lower heating clamper including a front end surface contacting with the lower perpendicular tooth of the lower shear bonding mold and adapted to generate heat by receiving power from the power supply; upper and lower pressing cylinders moving the upper and lower shear bonding molds upwardly or downwardly so as to apply load; and upper and lower clamping cylinders moving the upper and lower heating clampers upwardly or downwardly so as to (Continued)

apply clamping force and load, wherein the metal plates are disposed between the upper shear bonding mold and heating clamper, and the lower shear bonding mold and heating clamper.

15 Claims, 14 Drawing Sheets

(51) Int. Cl.
*B23K 20/02* (2006.01)
*B23D 31/00* (2006.01)

(58) Field of Classification Search
CPC ........ B23K 20/02; B23D 15/00; B23D 15/08; B23D 31/00; B23D 35/001; B23D 79/026
USPC .................... 228/44.3, 173.6, 265, 15.1, 212
See application file for complete search history.

(56) References Cited

U.S. PATENT DOCUMENTS

2001/0017312 A1* 8/2001 Horii .................... B23D 35/001
228/173.6
2008/0190992 A1* 8/2008 Jin ....................... B23K 20/023
228/44.3

FOREIGN PATENT DOCUMENTS

KR 10-0743857 7/2007
KR 10-2010-0079223 7/2010

* cited by examiner

SHEAR BONDING DEVICE AND SHEAR BONDING METHOD OF METAL PLATES

CROSS-REFERENCE TO RELATED APPLICATION

This application claims priority to and the benefit of Korean Patent Application No. 10-2013-0105737 filed in the Korean Intellectual Property Office on Sep. 3, 2013, the entire contents of which are incorporated herein by reference.

BACKGROUND OF THE INVENTION (a) Field of the Invention

The present invention relates to a shear bonding device and a shear bonding method of metal plates. More particularly, the present invention relates to a shear bonding device and a shear bonding method of metal plates that can shear and bond portions of an overlapped two metal plates by applying pressure along bonding portions.

(b) Description of the Related Art

A butt joint of metal plates, generally, is one of jointing technique of metal plates which is widely applied to entire industries. The butt joint is particularly used to bond stamping materials such as a tailor welded blanks (TWBs) that are manufactured by bonding metal plates having different rigidities, materials, and thicknesses or coil materials that should be supplied continuously.

An apparatus and a method for hot bonding metal plates that are related to bonding method of metal plates are disclosed in Korean Patent No. 0622524 (patent publication date: 2006, Sep. 13). According to Korean Patent No. 0622524, surfaces of two hot metal plates are overlapped and high pressure is applied to the two hot metal plates in closed bonding molds. Thereby, plastic flow occurs in the overlapped two hot metal plates and the overlapped two hot metal plates are bonded.

In further detail, when the two hot metal plates enter the bonding molds through inlets at both side portion of the bonding molds, overlapped surfaces of the two metal plates are shaved by shaving mold cutters inserted in the bonding molds. At this time, an overlapped excess material is pushed into a space formed by a shaving mold and a surface of a clamper due to closed structure of the bonding molds, and oxide films on surfaces of the front ends of the metal plates are also pushed to the space. Therefore, the oxide films on the overlapped surfaces of the metal plates are removed. At this state, the two metal plates are overlapped with each other and high pressure is applied by the upper bonding mold in a direction perpendicular to the overlapped surfaces. Therefore, pure metal materials from which the oxide films are removed are bonded through plastic flow.

According to a conventional butt joint techniques of metal plates, trimming process for aligning front ends of the metal plates should be performed before the metal plates are butt-jointed through, for example, welding.

In addition, a melting method such as welding mainly used in a conventional butt joint of the metal plates is hard to be applied to bonding nonferrous metal plates or thick metal plates.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a shear bonding device and a shear bonding method of metal plates having advantages of cutting front end portions of overlapped metal plates in hot solid state and butt-jointing the metal plates by extruding pressure of excess metal in bonding portions of the metal plates using perpendicular teeth and slanted teeth slightly overlapped with each other.

Another embodiment of the present invention provides a shear bonding device and a shear bonding method of metal plates having further advantages of agitating materials in the bonding portions through plastic flow and further strengthening bonding strength of the bonding portions by heating the bonding portions of the overlapped metal plates to become hot solid state by using upper and lower heating clampers, cutting and firstly pressing the metal plates using upper and lower shear bonding molds, and secondarily pressing the metal plate using the upper and lower heating clampers.

A shear bonding device of metal plates according to an exemplary embodiment of the present invention may include: an upper shear bonding mold having more than one upper perpendicular tooth and more than one upper slanted tooth formed alternately on a front end surface thereof; a lower shear bonding mold overlapped with the upper shear bonding mold in a vertical direction by a predetermined width below the upper shear bonding mold, and having more than one lower perpendicular tooth corresponding to the more than one upper slanted tooth and the more than one upper perpendicular tooth corresponding to the more than one lower slanted tooth formed alternately on a front end surface confronting the upper shear bonding mold; an upper heating clamper including a front end surface contacting with the upper perpendicular tooth of the upper shear bonding mold and adapted to generate heat by receiving power from a power supply; a lower heating clamper including a front end surface contacting with the lower perpendicular tooth of the lower shear bonding mold and adapted to generate heat by receiving power from the power supply; upper and lower pressing cylinders moving the upper and lower shear bonding molds upwardly or downwardly so as to apply load; and upper and lower clamping cylinders moving the upper and lower heating clampers upwardly or downwardly so as to apply clamping force and load, wherein the metal plates are disposed between the upper shear bonding mold and heating clamper, and the lower shear bonding mold and heating clamper.

The upper perpendicular tooth may be formed vertically to a lower surface of the upper shear bonding mold contacting with the metal plates, and the upper slanted tooth may be formed of a slanted surface having an acute angle to the lower surface of the upper shear bonding mold.

The lower perpendicular tooth may be formed vertically to an upper surface of the lower shear bonding mold contacting with the metal plates, and the lower slanted tooth may be formed of a slanted surface having an acute angle to the upper surface of the lower shear bonding mold.

The slanted surfaces of the upper and lower slanted teeth may have the same slanted angle.

Spaces into which excess metal of bonding portions of the metal plates is extruded may be formed among the slanted surfaces formed at the upper and lower slanted teeth, both end surfaces of the upper and lower perpendicular teeth formed at both sides of the slanted surfaces, and vertical interior surfaces of the upper and lower heating clampers corresponding to the slanted surfaces.

Each of slanted front ends of the upper and lower slanted teeth contacting with the metal plates may be positioned at an interior of the upper and lower shear bonding molds to each of vertical front ends of the upper and lower perpendicular teeth contacting with the metal plates by a predetermined distance.

Extruding pressure of the excess metal may be set by adjusting widths and slanted angles of the slanted surfaces of the upper and lower slanted teeth and a distance between the slanted front ends and the vertical front ends.

The vertical interior surfaces of the upper and lower heating clampers contacting with the upper and lower perpendicular teeth may be perpendicular to clamping surfaces for clamping the metal plates.

The shear bonding device may further include a plurality of upper and lower heating clampers, wherein the plurality of upper and lower heating clampers are disposed alternately to each other on upper and lower portion of the metal plates.

A shear bonding device of metal plates according to another exemplary embodiment of the present invention may include: an upper shear bonding mold having a front end surface provided alternately with more than one upper perpendicular tooth formed vertically to a lower surface thereof and more than one upper slanted tooth formed of a slanted surface having an acute angle to the lower surface thereof; a lower shear bonding mold overlapped with the upper shear bonding mold in a vertical direction by a predetermined width below the upper shear bonding mold, and having a front end surface confronting the upper shear bonding mold and provided alternately with more than one lower perpendicular tooth corresponding to the more than one upper slanted tooth and formed vertically to an upper surface thereof, and more than one lower slanted tooth corresponding to the more than one upper perpendicular tooth and formed of a slanted surface having an acute angle to the upper surface thereof; an upper heating clamper including a front end surface contacting with the upper perpendicular tooth of the upper shear bonding mold and adapted to generate heat by receiving power from a power supply; a lower heating clamper including a front end surface contacting with the lower perpendicular tooth of the lower shear bonding mold and adapted to generate heat by receiving power from the power supply; upper and lower pressing cylinders moving the upper and lower shear bonding mold upwardly or downwardly so as to apply load to the metal plates disposed between the upper shear bonding mold and the upper heating clamper, and the lower shear bonding mold and the lower heating clamper; and upper and lower clamping cylinders moving the upper and lower heating clampers upwardly or downwardly so as to apply clamping force and load.

Spaces into which excess metal of bonding portions of the metal plates is extruded may be formed among the slanted surfaces formed at the upper and lower slanted teeth, both end surfaces of the upper and lower perpendicular teeth formed at both sides of the slanted surfaces, and vertical interior surfaces of the upper and lower heating clampers corresponding to the slanted surfaces.

Each of slanted front ends of the upper and lower slanted teeth contacting with the metal plates may be positioned at an interior of the upper and lower shear bonding molds to each of vertical front ends of the upper and lower perpendicular teeth contacting with the metal plates by a predetermined distance.

Extruding pressure of the excess metal may be set by adjusting widths and slanted angles of the slanted surfaces of the upper and lower slanted teeth and a distance between the slanted front ends and the vertical front ends.

The vertical interior surfaces of the upper and lower heating clampers contacting with the upper and lower perpendicular teeth may be perpendicular to clamping surfaces for clamping the metal plates.

The shear bonding device may further include a plurality of upper and lower heating clampers, wherein the plurality of upper and lower heating clampers are disposed alternately to each other on upper and lower portion of the metal plates.

A shear bonding method of metal plates according to other exemplary embodiment of the present invention may bond metal plates using the shear bonding device.

The shear bonding method may include: providing the metal plates between the upper shear bonding mold and the upper heating clamper, and the lower shear bonding mold and the lower heating clamper such that front end portions of the metal plates are overlapped with each other by a predetermined width W3; causing the overlapped front end portions to become hot solid state by heating the overlapped front end portions in a state of clamping the metal plates by the upper and lower heating clampers; and shearing the front end portions of the metal plates by moving the upper and lower shear bonding molds in the same stroke and boding the metal plates by extruding pressure generated when extruding excess metal of bonding portions in a shearing process of the front end portions.

The shear bonding method may further include removing a bead generated close to the bonding portions and bonding the metal plates through plastic flow of material in the bonding portions by moving the upper and lower heating clampers in the same stroke and further pressing the front end portions of the metal plates.

The excess metal may be extruded into a space formed among slanted surfaces formed at the upper and lower slanted teeth, both end surfaces of the upper and lower perpendicular teeth formed at both sides of the slanted surfaces, and vertical interior surfaces of the upper and lower heating clampers corresponding to the slanted surfaces.

Extruding pressure of the excess metal may be set by adjusting widths and slanted angles of the slanted surfaces of the upper and lower slanted teeth and a distance between the slanted front ends and the vertical front ends.

<Description of symbols>

Figure 1:
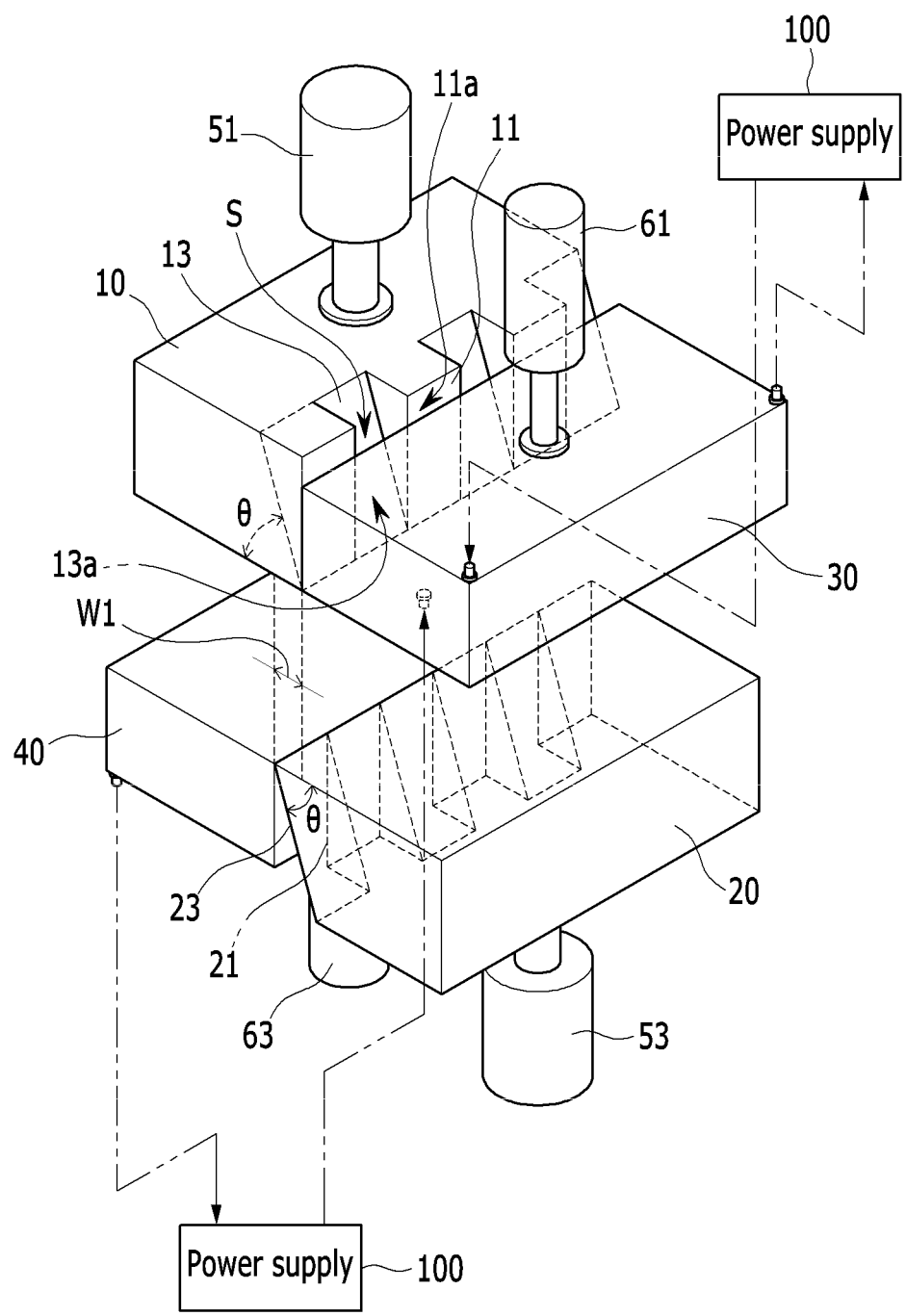
FIG. 1 is a perspective view of a shear bonding device according to an exemplary embodiment of the present invention.

| | |
|---|---|
| 10: upper shear bonding mold | |
| 20: lower shear bonding mold | |
| 30: upper heating clamper | |
| 40: lower heating clamper | |
| 51, 53: upper and lower pressing cylinders | |
| 61, 63: upper and lower clamping cylinders | |
| 11, 21: upper and lower perpendicular teeth | |
| 11a, 21a: vertical surfaces of upper and lower perpendicular teeth | |
| 11b, 21b: front ends of upper and lower perpendicular teeth | |
| 13, 23: upper and lower slanted teeth | |
| 13a, 23a: slanted surfaces of upper and lower slanted teeth | |
| 13b, 23b: front ends of upper and lower slanted teeth | |
| 15, 25: side surfaces of upper and lower perpendicular teeth | |
| 31, 41: vertical interior surfaces of upper and lower heating clampers | |
| 100: power supply | S: space |
| W1, W2, W3: width | θ: acute angle (slanted angle) |
| P: metal plate | E: front end portion |
| BP: bonding portion | M: excess metal |
| F: fixed body | B: bead |
| T: gap | |

DETAILED DESCRIPTION OF THE EMBODIMENTS

An exemplary embodiment of the present invention will hereinafter be described in detail with reference to the accompanying drawings.

Since size and thickness of each component illustrated in the drawings are arbitrarily represented for ease of explanation, the present invention is not limited to the drawings. Thicknesses of many parts and regions are enlarged.

In addition, description of components that are not necessary for explaining the present exemplary embodiments will be omitted.

Figure 2:
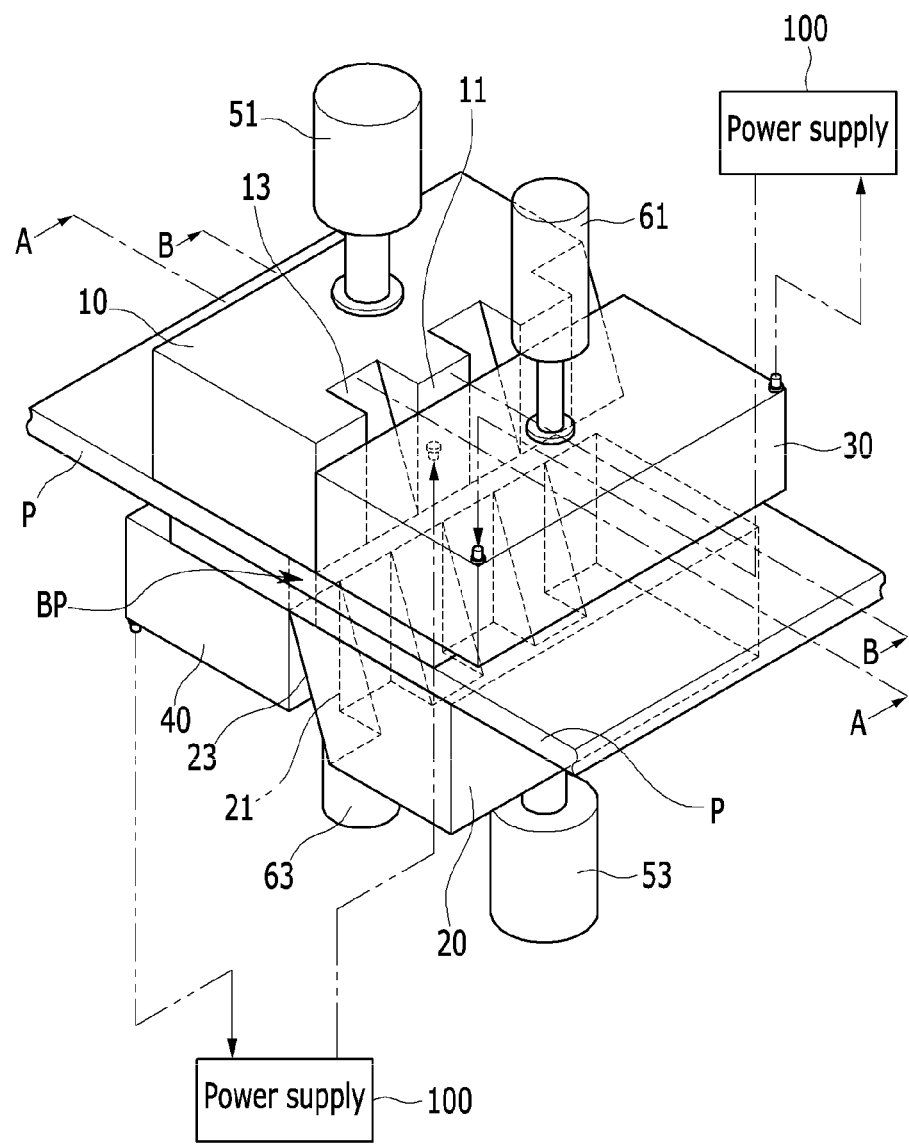
FIG. 2 is a perspective view of a shear bonding device according to an exemplary embodiment of the present invention with metal plates being supplied into the shear bonding device.
Figure 3:
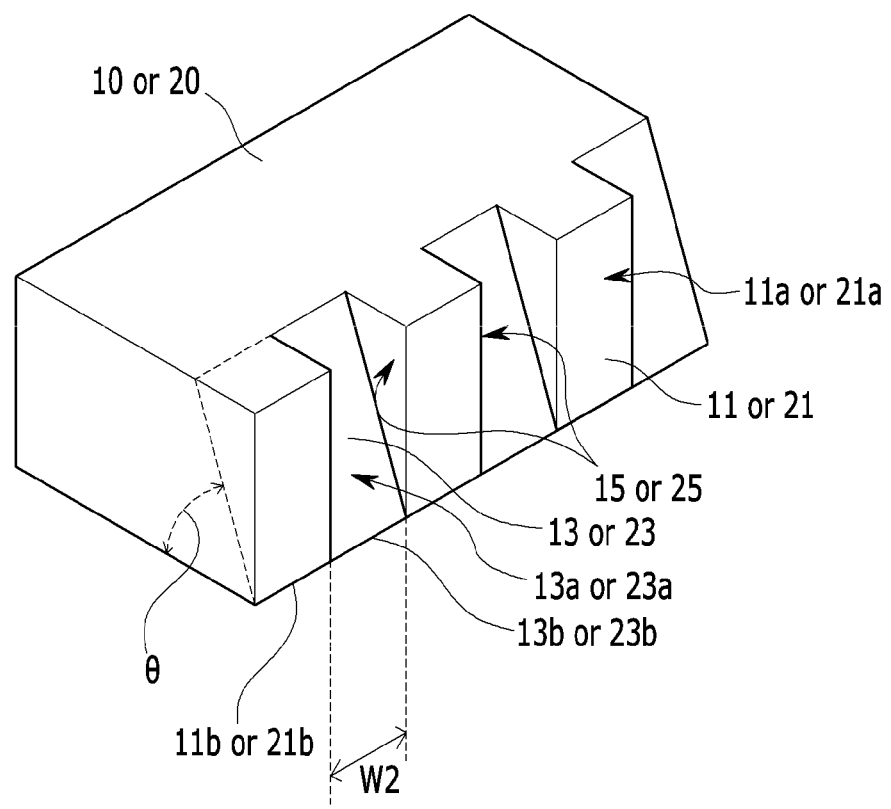
FIG. 3 is a perspective view of an upper or a lower shear bonding mold applicable to a shear bonding device according to an exemplary embodiment of the present invention.

FIG. 1 is a perspective view of a shear bonding device according to an exemplary embodiment of the present invention, FIG. 2 is a perspective view of a shear bonding device according to an exemplary embodiment of the present invention with metal plates being supplied into the shear bonding device, and FIG. 3 is a perspective view of an upper or a lower shear bonding mold applicable to a shear bonding device according to an exemplary embodiment of the present invention.

A shear bonding device of metal plates according to an exemplary embodiment of the present invention cuts front end portions irregularly after the front end portions are overlapped with each other by a predetermined width so as for overlapped metal plates to become hot solid state. Therefore, the overlapped metal plates are bonded by extruding pressure of excess metal in bonding portions and agitating materials in the bonding portions through plastic flow.

Referring to FIG. 1 and FIG. 2, the shear bonding device includes upper and lower shear bonding molds 10 and 20, upper and lower heating clampers 30 and 40, upper and lower pressing cylinders 51 and 53, and upper and lower clamping cylinders 61 and 63.

Referring to FIG. 1 to FIG. 3, the upper shear bonding mold 10 is disposed at one side of an upper portion and has more than one upper perpendicular teeth 11 and upper slanted teeth 13 formed alternately at the other side surface (i.e., a right surface in the drawing) of the upper shear bonding mold 10.

At this time, the upper perpendicular tooth 11 is formed of a vertical surface 11a that is perpendicular to a lower surface of the upper shear bonding mold 10, and the upper slanted tooth 13 is formed of a slanted surface 13a that has an acute angle θ to the lower surface of the upper shear bonding mold 10.

The upper perpendicular teeth 11 and the upper slanted teeth 13 may be formed at the entirety or, if necessary, at a portion of the other side surface of the upper shear bonding mold 10.

Referring to FIG. 1 to FIG. 3, the lower shear bonding mold 20 is disposed at the one side of a lower portion with respect to the upper shear bonding mold 10. The other side portion of the upper shear bonding mold 10 and one side portion of the lower shear bonding mold 20 facing the other side portion of the upper shear bonding mold 10 are overlapped with each other by a predetermined width W1. In addition, more than one lower perpendicular teeth 21 and lower slanted teeth 23 are formed alternately at one side surface (i.e., a left surface in the drawing) of the lower shear bonding mold 20. Each of the lower perpendicular teeth 21 faces each of the upper slanted teeth 13, and each of the lower slanted teeth 23 faces each of the upper perpendicular teeth 11.

At this time, the lower perpendicular tooth 21 is formed of a vertical surface 21a that is perpendicular to an upper surface of the lower shear bonding mold 20, and the lower slanted tooth 23 is formed of a slanted surface 23a that has an acute angle θ to the upper surface of the lower shear bonding mold 20.

Figure 4:
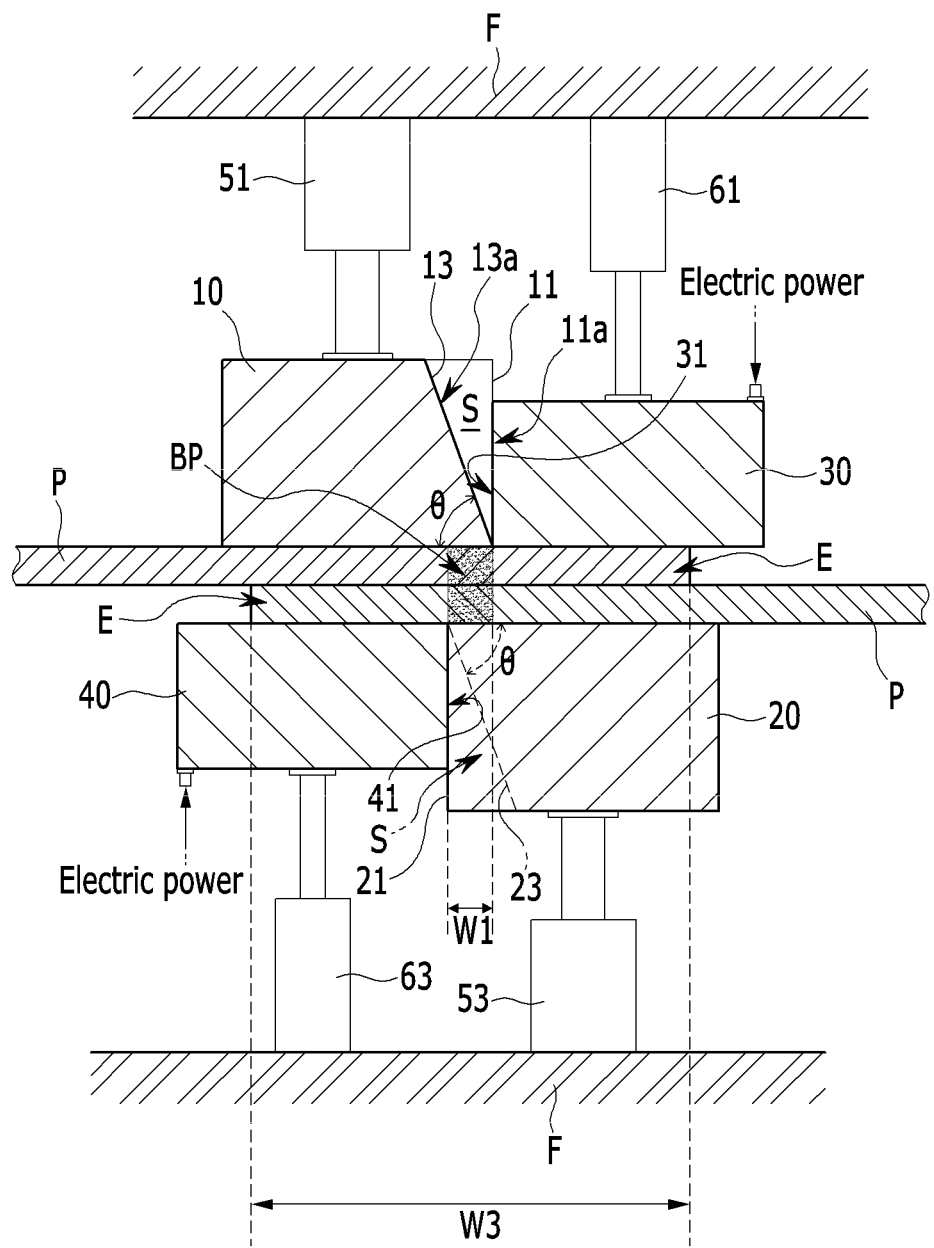
FIG. 4 is a cross-sectional view taken along the line A-A in FIG. 2.
Figure 5:
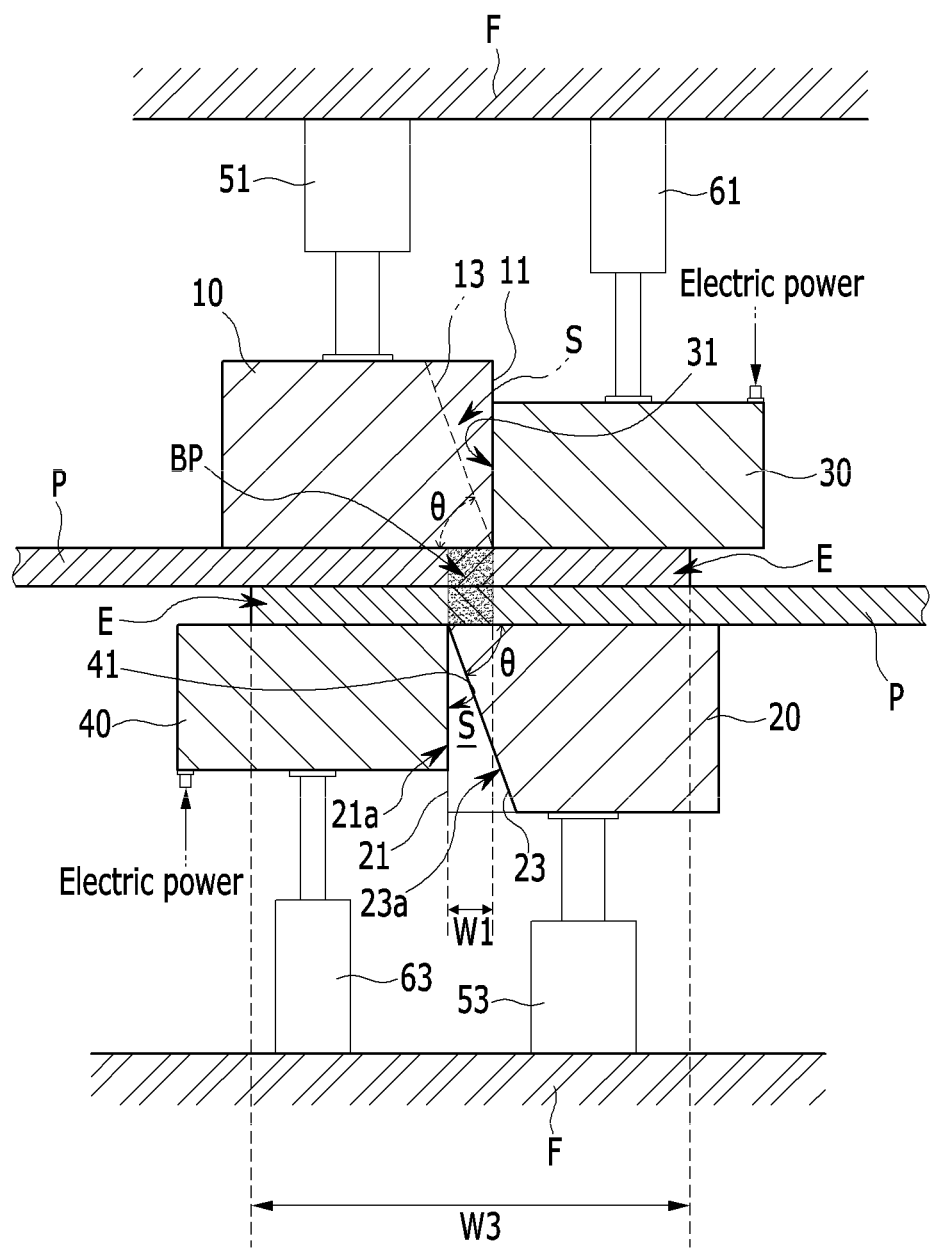
FIG. 5 is a cross-sectional view taken along the line B-B in FIG. 2.

FIG. 4 is a cross-sectional view taken along the line A-A in FIG. 2 and FIG. 5 is a cross-sectional view taken along the line B-B in FIG. 2.

Referring to FIG. 3 to FIG. 5, spaces S for receiving extruded excess metals M (referring to FIG. 8) of the bonding portions BP are formed among the slanted surfaces 13a and 23a formed at the upper and lower slanted teeth 13 and 23, both side surfaces 15 and 25 of the upper and lower perpendicular teeth 11 and 21 formed at both sides of the slanted surfaces 13a and 23a, and vertical interior surfaces 31 and 41 of the upper and lower heating clampers 30 and 40 corresponding to the slanted surfaces 13a and 23a.

It is illustrated in FIG. 4 that the upper perpendicular teeth 11 and the upper slanted teeth 13 are formed at the other side surface (i.e., the right surface in the drawing) of the upper shear bonding mold 10, the upper perpendicular teeth 11 are formed of the vertical surfaces 11a that are perpendicular to the lower surface of the upper shear bonding mold 10, and the upper slanted teeth 13 are formed of the slanted surfaces 13a that have the acute angle θ to the lower surface of the upper shear bonding mold 10.

In addition, it is illustrated in FIG. 5 that the lower perpendicular teeth 21 and the lower slanted teeth 23 are formed at the one side surface (i.e., the left surface in the drawing) of the lower shear bonding mold 20, the lower perpendicular teeth 21 are formed of the vertical surfaces 21a that are perpendicular to the upper surface of the lower shear bonding mold 20, and the lower slanted teeth 23 are formed of the slanted surfaces 23a that have the acute angle θ to the upper surface of the lower shear bonding mold 20.

The slanted surfaces 13a and 23a of the upper and lower slanted teeth 13 and 23 may have the same slanted angle, but are not limited thereto.

In addition, the other side portion of the upper shear bonding mold 10 and the one side portion of the lower shear bonding mold 20 are overlapped in a vertical direction by the predetermined width W1, and the bonding portions BP of the overlapped metal plates P are defined by the width W1 of the overlapped portion of the upper and lower shear bonding molds 10 and 20.

Referring to FIG. 1 and FIG. 4, the upper heating clamper 30 is disposed at a side of the upper shear bonding mold 10 in a state that the vertical interior surface 31 of the upper heating clamper 30 contacts the upper perpendicular tooth 11 of the upper shear bonding mold 10, and is adapted to generate heat by receiving electric power from a power supply 100.

Referring to FIG. 5 and FIG. 1, the lower heating clamper 40 is disposed at the other side of the lower shear bonding mold 20 in a state that the vertical interior surface 41 of the lower heating clamper 40 contacts the lower perpendicular tooth 21 of the lower shear bonding mold 20, and is adapted to generate heat by receiving electric power from the power supply 100.

Referring to FIG. 4 or FIG. 5, the vertical interior surface 31 of the upper heating clamper 30 contacting the upper perpendicular tooth 11 is perpendicular to a clamping surface (i.e., a lower surface) that clamps the metal plates. In the same way, the vertical interior surface 41 of the lower heating clamper 40 contacting the lower perpendicular tooth 21 is perpendicular to a clamping surface (i.e., an upper surface) that clamps the metal plates P.

The upper and lower heating clampers 10 and 20 are made of ferrous material having a high electric resistance. Therefore, if current is supplied to the upper and lower heating clampers 10 and 20, the upper and lower heating clampers 10 and 20 generate heat. Therefore, the upper and lower heating clampers 10 and 20 heat the metal plates P contacting the upper and lower heating clampers 10 and 20 through heat conduction.

Figure 6:
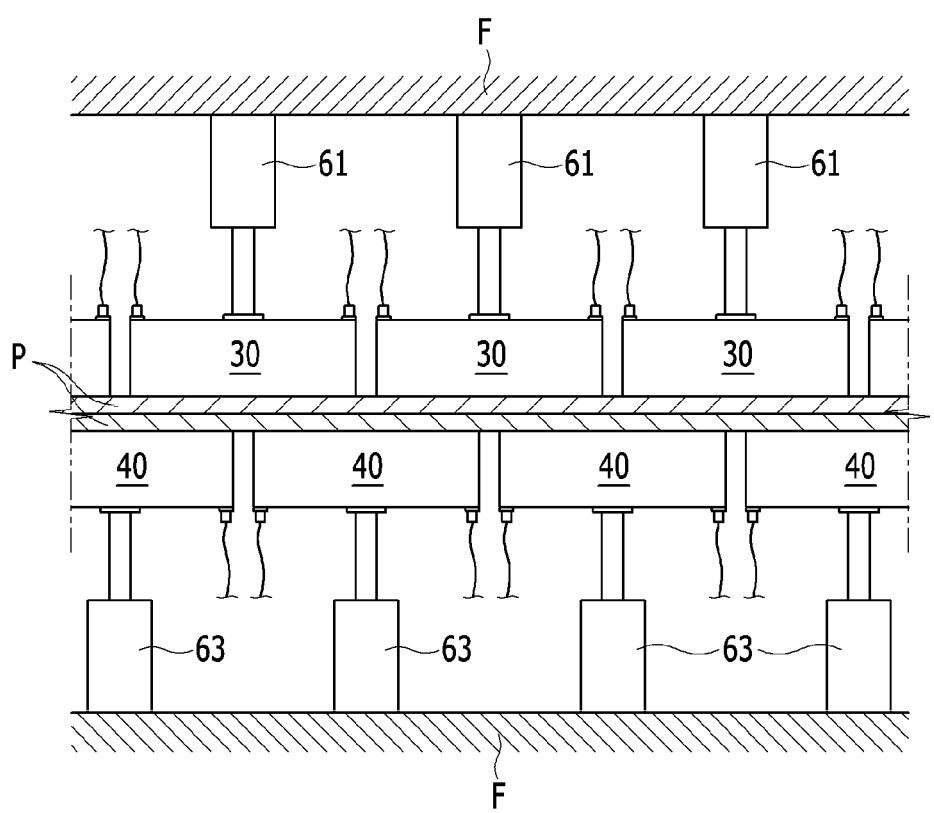
FIG. 6 is a layout view of upper and lower heating clampers applicable to a shear bonding device according to an exemplary embodiment of the present invention.

FIG. 6 is a layout view of upper and lower heating clampers applicable to a shear bonding device according to an exemplary embodiment of the present invention.

Referring to FIG. 6, a plurality of upper and lower heating clampers 30 and 40 may be provided according to restricting conditions of power supply and may be alternately disposed above an upper portion and below a lower portion of the overlapped metal plates P.

In addition, the upper and lower shear bonding molds 10 and 20 are adapted to move downwardly or upwardly by the upper and lower pressing cylinders 51 and 53, respectively.

Referring to FIG. 4 or FIG. 5, the upper and lower pressing cylinders 51 and 53 are mounted on a fixed body F and are connected to the upper and lower shear bonding molds 10 and 20 through operating rods so as to move the upper and lower shear bonding molds 10 and 20 downwardly or upwardly. Therefore, the upper and lower shear bonding molds 10 and 20 apply welding force to the metal plates P.

At least one upper and lower pressing cylinders 51 and 53 may be provided for the upper and lower shear bonding molds 10 and 20, respectively.

In addition, the upper and lower heating clampers 30 and 40 are adapted to move downwardly or upwardly by the upper and lower clamping cylinders 61 and 63, respectively.

Referring to FIG. 4 or FIG. 5, the upper and lower clamping cylinders 61 and 63 are mounted on the fixed body F and are connected to the upper and lower heating clampers 30 and 40 through operating rods so as to move the upper and lower heating clampers 30 and 40 downwardly or upwardly. Therefore, the upper and lower heating clampers 30 and 40 apply clamping force and welding force to the metal plates P.

At least one upper and lower clamping cylinders 61 and 63 may be provided for the upper and lower heating clampers 30 and 40, respectively.

Figure 7:
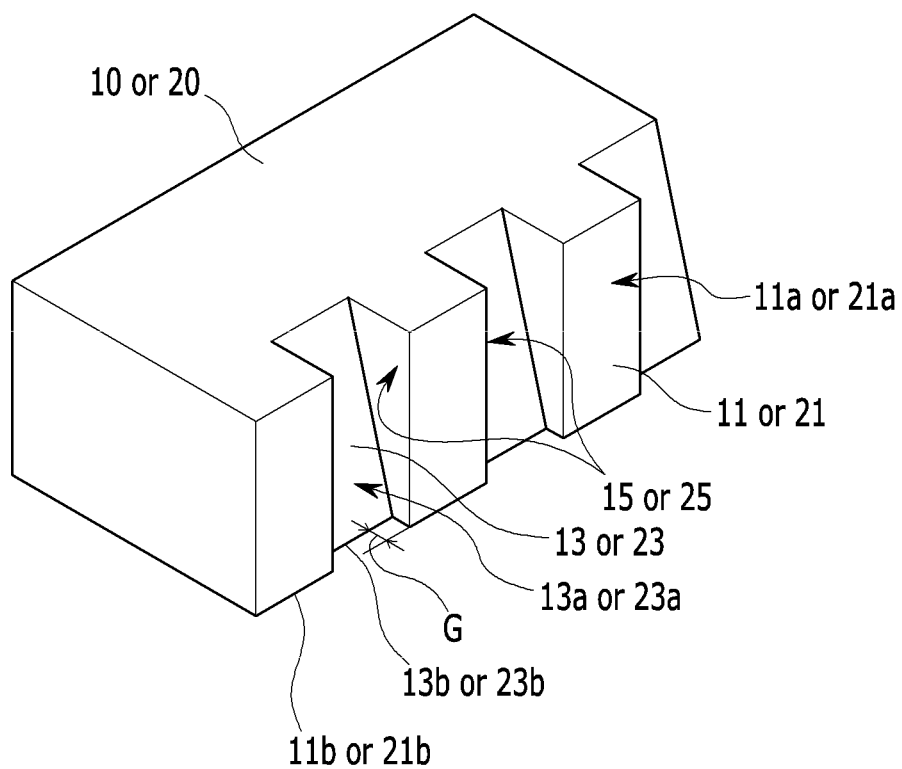
FIG. 7 is a perspective view of an upper or a lower shear bonding mold applicable to a shear bonding device according to another exemplary embodiment of the present invention.

FIG. 7 is a perspective view of an upper or a lower shear bonding mold applicable to a shear bonding device according to another exemplary embodiment of the present invention.

Referring to FIG. 7, a slanted front end 13b (i.e., the other end) of the upper slanted tooth 13 and a slanted front end 23b (i.e., the one end) of the lower slanted tooth 23 contacting the metal plates P are positioned at an interior of the upper and lower shear bonding molds 10 and 20 to a vertical front end 11b of the upper perpendicular tooth 11 and a vertical front end 21b of the lower perpendicular tooth 11 and 21 contacting the metal plates P by a predetermined distance G, respectively.

Herein, the predetermined distance G between the slanted front end 13b and 23b and the vertical front end 11b and 21b is a major factor affecting extruding pressure of the excess metal M when the excess metal M in the bonding portions BP is extruded.

That is, the extruding pressure of the excess metal M, as shown in FIG. 3, may be set by adjusting widths W2 and slanged angles θ of the slanted surfaces 13a and 23a of the upper and lower slanted teeth 13 and 23 and the distance G between the slanted front end 13b and 23b and the vertical front end 11b and 21b.

The shear bonding device of metal plates according to an exemplary embodiment of the present invention presses the bonding portions BP of the metal plates P after heating the front end portions E of the overlapped metal plates P so as to cause the front end portions E to become hot solid state such that the metal plates P are bonded by the extruding pressure of the excess metal M in the bonding portions BP and agitating materials in the bonding portion BP through plastic flow.

Hereinafter, a shear bonding method that cuts and bonds two metal plates P having the front end portions E overlapped by the predetermined width W3 by using the shear bonding device of metal plates will be described in detail with reference to FIG. 8 and FIG. 9.

Figure 8A:
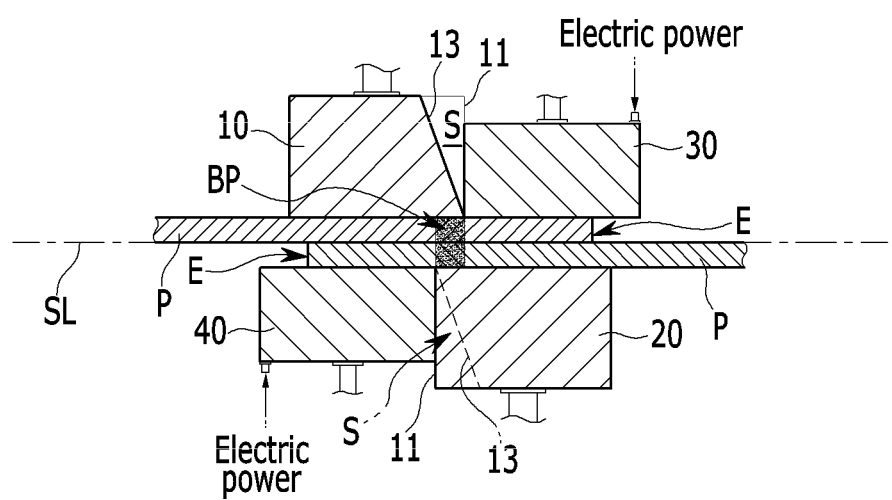
FIGS. 8A, 8B, and 8C illustrate steps of a shear bonding method according to an exemplary embodiment of the present invention through a cross-sectional view taken along the line A-A in FIG. 2.
Figure 8B:
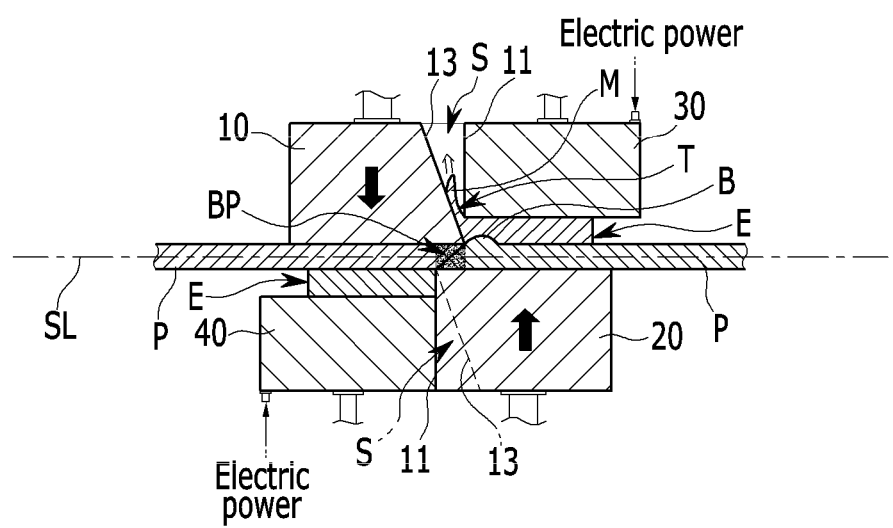
Figure 8C:
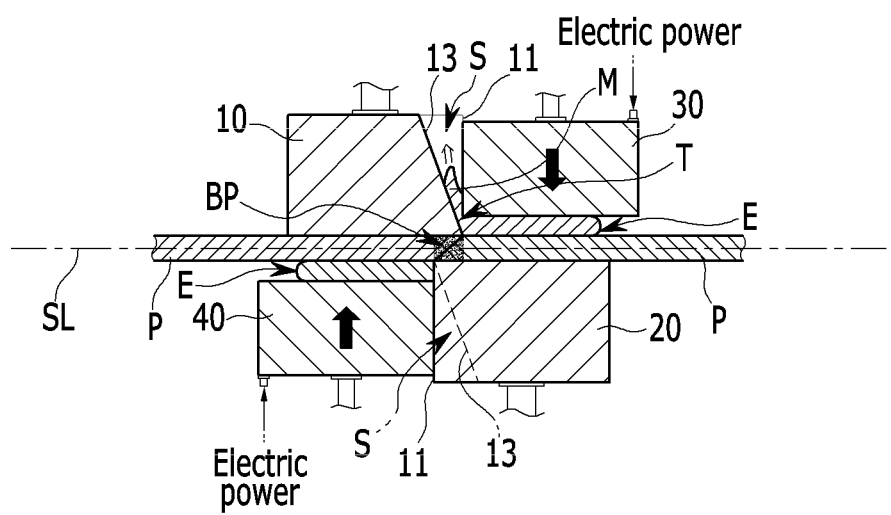

FIGS. 8A, 8B, and 8C illustrate steps of a shear bonding method according to an exemplary embodiment of the present invention through a cross-sectional view taken along the line A-A in FIG. 2, and FIGS. 9A, 9B, and 9C illustrate steps of a shear bonding method according to an exemplary embodiment of the present invention through a cross-sectional view taken along the line B-B in FIG. 2.

FIGS. 8A, 8B, and 8C and FIGS. 9A, 9B, and 9C represent the same step, respectively.

Figure 9A:
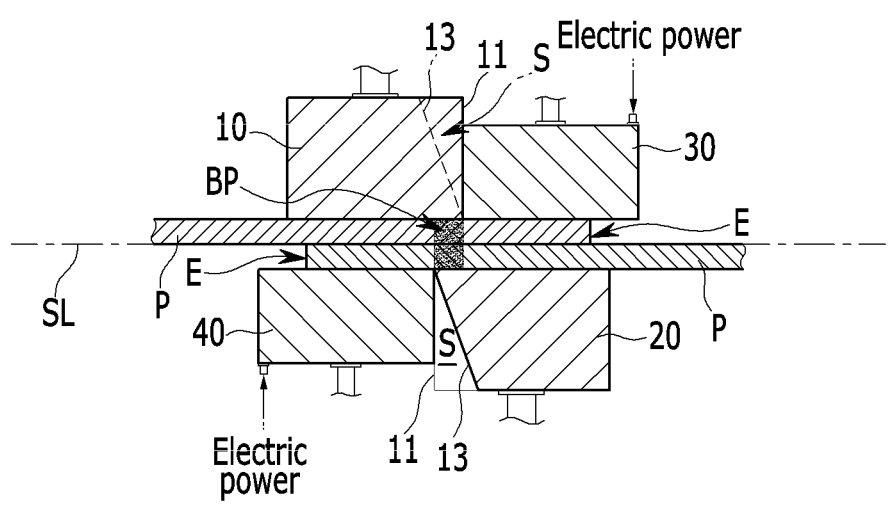
FIGS. 9A, 9B, and 9C illustrate steps of a shear bonding method according to an exemplary embodiment of the present invention through a cross-sectional view taken along the line B-B in FIG. 2.

The shear bonding method using the shear bonding device according to the exemplary embodiment of the present invention begins with the step shown in FIG. 8A and FIG. 9A. At the step, two metal plates P are disposed with the front end portions E being overlapped by the predetermined width W3 between the upper shear bonding mold 10 and the upper heating clamper 30, and the lower shear bonding mold 20 and the lower heating clamper 40, the metal plates P are clamped by the upper and lower heating clampers 30 and 40, and the overlapped front end portions E are heated to become the hot solid state by the upper and lower heating clampers 30 and 40.

That is, the upper and lower heating clampers 30 and 40 heats the metal plates P by receiving electric power from the power supply 100 in a state of clamping the overlapped two metal plates P. At this time, heat is concentrated on the bonding portions BP of the metal plates P corresponding to the predetermined width W1 by which the upper and lower shear bonding molds 10 and 20 are overlapped.

Figure 9B:
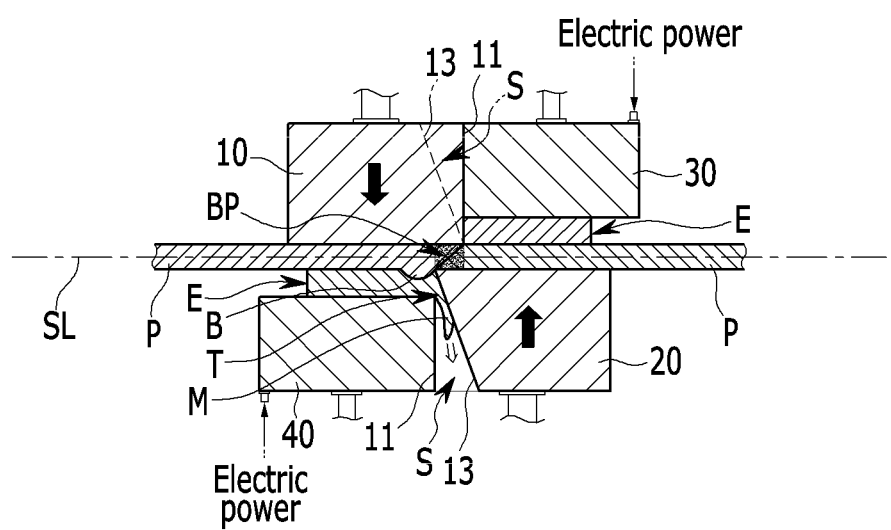

At a step shown in FIG. 8B and FIG. 9B, the upper and lower pressing cylinders 51 and 53 operate the upper and lower shear bonding molds 10 and 20 to press the metal plates P with the same stroke with reference to a center line SL, respectively.

In this case, the upper and lower shear bonding molds 10 and 20 cut the front end portions E of the metal plates P, and the excess metal M of the bonding portions BP is extruded to the spaces S formed at the slanted teeth 13 and 23 through a gap T formed between the slanted front ends 13b and 23b of the slanted teeth 13 and 23 contacting the metal plates P and the vertical interior surfaces 31 and 41 of the heating clampers 30 and 40 corresponding thereto when the front end portions E are cut. Therefore, the extruding pressure is generated.

The extruding pressure of the excess metal M compresses hot solid metal in the bonding portions BP of the metal plates P such that the metal plates P are bonded.

At this time, a convex bead B may be formed at the metal plates P close to the bonding portions BP due to the extruding pressure of the excess metal M.

Figure 9C:
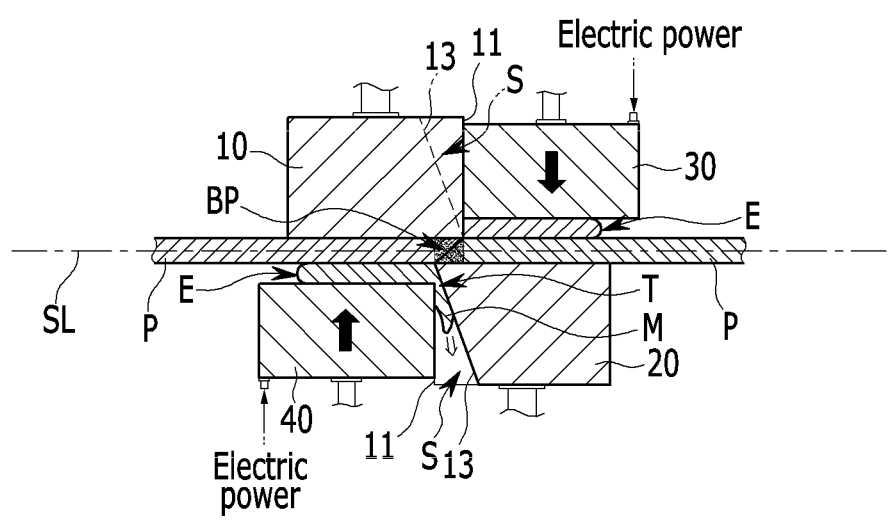

At a step shown in FIG. 8C and FIG. 9C, the upper and lower clamping cylinders 61 and 63 operate the upper and lower heating clampers 30 and 40 to press the metal plates P with the same stroke with reference to the center line SL, respectively. Thereby, the front end portions E of the metal plates P in the hot solid state are additionally pressed, In this case, the metal plates P are flattened by removing the bead B formed close to the bonding portions BP and a portion of the excess metal M is additionally extruded. Therefore, the material in the bonding portion BP is agitated through plastic flow and bonding strength may be increased.

Figure 10:
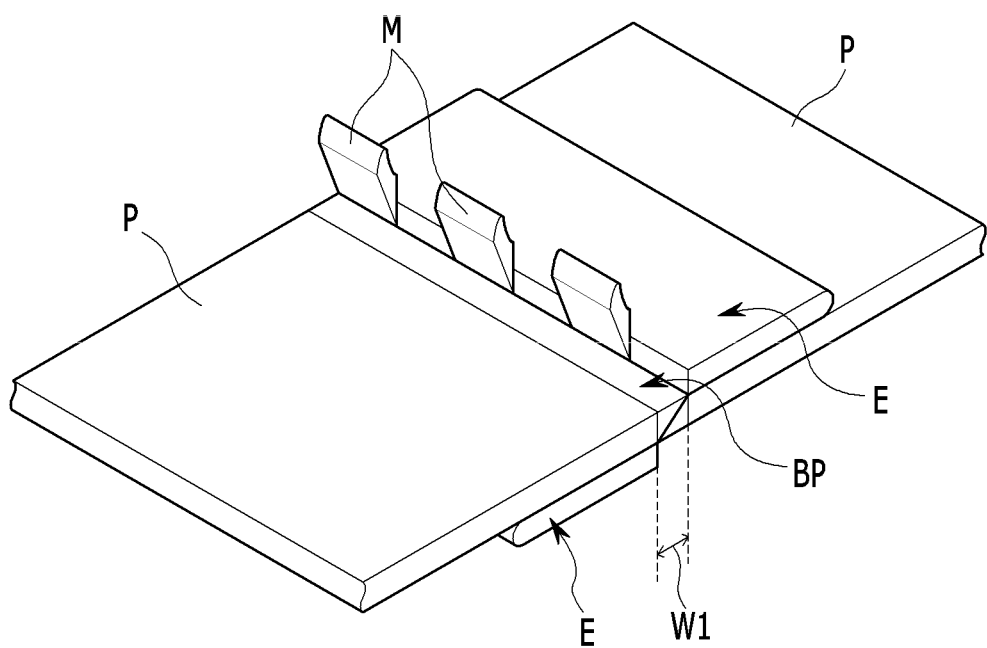
FIG. 10 is a perspective view of a shear bonding metal plate with excess metal and plate scraps not being removed, which is bonded by a shear bonding device according to an exemplary embodiment of the present invention.

FIG. 10 is a perspective view of a shear bonding metal plate with excess metal and plate scraps not being removed, which is bonded by a shear bonding device according to an exemplary embodiment of the present invention.

Referring to FIG. 10, the overlapped two metal plates P are butt-jointed at the bonding portions BP to become one metal plate P through the shear bonding method. At this time, the front end portions E of the metal plates P cut with the extruded excess metal M remains as scraps at an upper portion and a lower portion close to the bonding portions BP.

The scraps are not bonded to the metal plates P and can be separated from the metal plates P by applying slight impact thereto.

The shear bonding device and the shear bonding method of the metal plates according to the exemplary embodiments of the present invention may cut the front end portions E of the overlapped metal plates P in hot solid state and butt-joint the metal plates P by extruding pressure of the excess metal M in the bonding portion BP of the metal plates P using the perpendicular teeth 11 and 21 and the slanted teeth 13 and 23 slightly overlapped in the vertical direction.

In addition, the shear bonding device and the shear bonding method may agitate materials in the bonding portions BP through plastic flow and further strengthen bonding strength of the bonding portions BP by heating bonding portions BP of the overlapped metal plates P to become hot solid state by using the upper and lower heating clampers 30 and 40, cutting and firstly pressing the metal plates P using the upper and lower shear bonding molds 10 and 20, and secondarily pressing the metal plates P using the upper and lower heating clampers 30 and 40.

In addition, since the front end portions E of the overlapped metal plates P are cut in the hot solid state, the metal plates P can be bonded even though the front end portions E of the metal plates P have irregular shapes.

In addition, even though the metal plates P have comparatively long bonding portions BP, the metal plates P can be bonded in solid state by a single stage process. Further, process time may be short compared to a conventional bonding method.

In addition, since plastic flow occurs in the material of the bonding portions BP in the hot solid state by strong extruding pressure and heat, the method can be applied to bonding the metal plates of different types or the metal plates having different thicknesses.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A shear bonding device of metal plates comprising:
   an upper shear bonding mold having a plurality of upper perpendicular teeth and a plurality of upper slanted teeth formed alternately on a front end surface thereof;
   a lower shear bonding mold overlapped with the upper shear bonding mold in a vertical direction by a predetermined width below the upper shear bonding mold, and having a plurality of lower perpendicular teeth and a plurality of lower slanted teeth formed alternatively on a front end surface confronting the upper shear bonding mold, the plurality of lower perpendicular teeth correspond to the plurality of upper slanted teeth of the upper shear bonding mold and the plurality of upper perpendicular teeth correspond to the plurality of lower slanted teeth of the upper shear bonding mold;
   an upper heating clamper including a front end surface contacting with the plurality of upper perpendicular teeth of the upper shear bonding mold and adapted to generate heat by receiving power from a power supply;
   a lower heating clamper including a front end surface contacting with the plurality of lower perpendicular teeth of the lower shear bonding mold and adapted to generate heat by receiving power from the power supply;
   an upper pressing cylinder and a lower pressing cylinder moving the upper shear bonding mold and the lower shear bonding molds upwardly or downwardly so as to apply a welding force on the metal plates; and
   an upper clamping cylinder and a lower clamping cylinders moving the upper heating clamper and the lower heating clampers upwardly or downwardly so as to apply a clamping force and a welding force on the metal plates, wherein the metal plates are disposed between the upper shear bonding mold and the upper heating clamper, and the lower shear bonding mold and the lower heating clamper.

2. The shear bonding device of claim 1, wherein the plurality of upper perpendicular teeth are formed vertically to a lower surface of the upper shear bonding mold contacting with the metal plates, and the plurality of upper slanted teeth are formed of a slanted surface having an acute angle formed from the lower surface of the upper shear bonding mold.

3. The shear bonding device of claim 2, wherein the plurality of lower perpendicular teeth are formed vertically to an upper surface of the lower shear bonding mold contacting with the metal plates, and the plurality of lower slanted teeth are formed of a slanted surface having an acute angle formed from the upper surface of the lower shear bonding mold.

4. The shear bonding device of claim 3, wherein the slanted surfaces of the upper and lower slanted teeth have the same slanted angle.

5. The shear bonding device of claim 1, wherein spaces into which excess metal of bonding portions of the metal plates is extruded are formed among the slanted surfaces formed at the upper and lower slanted teeth, both end surfaces of the upper and lower perpendicular teeth formed at both sides of the slanted surfaces, and vertical interior surfaces of the upper and lower heating clampers corresponding to the slanted surfaces.

6. The shear bonding device of claim 3, wherein slanted front ends of the plurality of upper slanted teeth contacting with the metal plates are receded from a front end surface of the upper shear bonding mold and have a predetermined distance from vertical front ends of the plurality of upper perpendicular teeth contacting with the metal plates, and slanted front ends of the plurality of lower slanted teeth contacting with the metal plates are receded from the front end surface of the lower shear bonding mold and have a predetermined distance from vertical front ends of the plurality of lower perpendicular teeth contacting with the metal plates.

7. The shear bonding device of claim 6, wherein extruding pressure of excess metal is set by adjusting widths and slanted angles of the slanted surfaces of the plurality of upper slanted teeth and the plurality of lower slanted teeth and a distance between the slanted front ends and the vertical front ends.

8. The shear bonding device of claim 5, wherein the vertical interior surfaces of the upper heating clamper and lower heating clampers contacting with the plurality of upper perpendicular teeth and the plurality of lower perpendicular teeth are perpendicular to clamping surfaces for clamping the metal plates.

9. The shear bonding device of claim 1,
wherein the upper heating clamper includes a plurality of separated upper units disposed at upper portions of the metal plates and the lower heating clamper includes a plurality of separated lower units disposed at lower portions of the metal plates, and
wherein the upper units and the lower units are disposed alternately to each other.

10. A shear bonding device of metal plates comprising:
an upper shear bonding mold having a front end surface provided alternately with a plurality of upper perpendicular teeth formed vertically to a lower surface thereof and a plurality of upper slanted teeth formed of a slanted surface having an acute angle formed from the lower surface thereof;

a lower shear bonding mold overlapped with the upper shear bonding mold in a vertical direction by a predetermined width below the upper shear bonding mold, and having a front end surface confronting the upper shear bonding mold and provided alternately with a plurality of lower perpendicular teeth corresponding to the plurality of upper slanted teeth and formed vertically to an upper surface thereof, and a plurality of lower slanted teeth corresponding to the plurality of upper perpendicular teeth and formed of a slanted surface having an acute angle formed from the upper surface thereof;

an upper heating clamper including a front end surface contacting with the plurality of upper perpendicular teeth of the upper shear bonding mold and adapted to generate heat by receiving power from a power supply;

a lower heating clamper including a front end surface contacting with the plurality of lower perpendicular teeth of the lower shear bonding mold and adapted to generate heat by receiving power from the power supply;

an upper pressing cylinder and a lower pressing cylinder moving the upper shear bonding mold and the lower shear bonding mold upwardly or downwardly so as to apply a welding force on the metal plates disposed between the upper shear bonding mold and the upper heating clamper, and between the lower shear bonding mold and the lower heating clamper; and an upper clamping cylinder and a lower clamping cylinder moving the upper heating clamper and the lower heating clamper upwardly or downwardly so as to apply a clamping force and a welding force on the metal plates.

11. The shear bonding device of claim 10, wherein spaces into which excess metal of bonding portions of the metal plates is extruded are formed among the slanted surfaces formed at the plurality of upper slanted teeth and the plurality of lower slanted teeth, both end surfaces of the plurality of upper perpendicular teeth and the plurality of lower perpendicular teeth formed at both sides of the slanted surfaces, and vertical interior surfaces of the upper heating clamper and the lower heating clamper corresponding to the slanted surfaces.

12. The shear bonding device of claim 11, wherein slanted front ends of the plurality of upper slanted teeth contacting the metal plates are receded from the front end surface of the upper shear bonding mold and have a predetermined distance from vertical front ends of the upper perpendicular teeth contacting with the metal plates, and slanted front ends of the plurality of lower slanted teeth contacting with the metal plates are receded from the front end surface of the lower shear bonding mold and have a predetermined distance from vertical front ends of the lower perpendicular teeth contacting with the metal plates.

13. The shear bonding device of claim 11, wherein extruding pressure of the excess metal is set by adjusting widths and slanted angles of the slanted surfaces of the plurality of upper slanted teeth and the plurality of lower slanted teeth and a distance between the slanted front ends and the vertical front ends.

14. The shear bonding device of claim 11, wherein the vertical interior surfaces of the upper heating clamper and the lower heating clampers contacting with the plurality of upper perpendicular teeth and the plurality of lower perpendicular teeth are perpendicular to clamping surfaces for clamping the metal plates.

15. The shear bonding device of claim 10,
wherein the upper heating clamper includes a plurality of separated upper units disposed at upper portions of the metal plates and the lower heating clamper includes a plurality of separated lower units disposed at lower portions of the metal plates, and
wherein the upper units and the lower units are disposed alternately to each other.

* * * * *